United States Patent
Hawley

(10) Patent No.: US 10,392,003 B2
(45) Date of Patent: Aug. 27, 2019

(54) NAVIGATION-ENHANCED BATTERY STATE OF CHARGE MAINTENANCE

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/669,762

(22) Filed: Aug. 4, 2017

(65) Prior Publication Data
US 2019/0039596 A1    Feb. 7, 2019

(51) Int. Cl.
| | | |
|---|---|---|
| *B60W 20/15* | (2016.01) | |
| *B60K 6/46* | (2007.10) | |
| *B60K 6/485* | (2007.10) | |
| *B60L 7/18* | (2006.01) | |
| *B60L 11/12* | (2006.01) | |
| *B60L 11/14* | (2006.01) | |
| *B60L 11/18* | (2006.01) | |

(52) U.S. Cl.
CPC ............... *B60W 20/15* (2016.01); *B60K 6/46* (2013.01); *B60K 6/485* (2013.01); *B60L 7/18* (2013.01); *B60L 11/123* (2013.01); *B60L 11/14* (2013.01); *B60L 11/1851* (2013.01)

(58) Field of Classification Search
CPC ......... B60W 20/15; B60K 6/46; B60K 6/485; B60L 7/18; B60L 11/14; B60L 11/1851; B60L 11/123
See application file for complete search history.

(56) References Cited

U.S. PATENT DOCUMENTS

| | | |
|---|---|---|
| 5,832,396 A | 11/1998 | Moroto |
| 8,374,740 B2 | 2/2013 | Druenert |
| 8,566,013 B2 | 10/2013 | Davis |
| 9,039,568 B2 | 5/2015 | Banker |
| 9,052,013 B2 | 6/2015 | Landes |
| 9,205,841 B2 | 12/2015 | Williams |
| 9,211,804 B2 | 12/2015 | Preece |
| 9,464,407 B2 | 10/2016 | Stutchbury |

(Continued)

FOREIGN PATENT DOCUMENTS

EP    1215071    9/2005

*Primary Examiner* — Mussa A Shaawat
(74) *Attorney, Agent, or Firm* — Sheppard, Mullin, Richter & Hampton LLP; Hector A. Agdeppa; Daniel N. Yannuzzi

(57) ABSTRACT

Systems and methods provide control the amount of battery SOC of a hybrid vehicle prior to reaching a downgrade section of roadway in order to offset the amount of energy that the hybrid vehicle will recuperate when traveling the downgrade. Navigation systems and methods are used to identify upcoming road conditions, such as downgrades. In this way, the battery SOC of the hybrid vehicle can maintain the capacity to allow a motor of the hybrid vehicle to assist in decelerating the hybrid vehicle during the downgrade if need be. Additionally, a situation where the battery is fully charged before reaching the end of the downgrade is avoided, which if not, could result in overcharging the battery, or having to switch to an engine-only mode of travel, where a driver must supplement engine braking with friction braking.

20 Claims, 5 Drawing Sheets

(56) References Cited

U.S. PATENT DOCUMENTS

| | | |
|---|---|---|
| 9,561,792 B2 | 2/2017 | Kodawara |
| 2004/0167705 A1 | 8/2004 | Lingman |
| 2010/0090650 A1* | 4/2010 | Yazami ............... H01M 10/443 320/132 |
| 2011/0106388 A1 | 5/2011 | Boeckenhoff |
| 2013/0096808 A1 | 4/2013 | DeLaSalle |
| 2013/0204490 A1* | 8/2013 | Pfefferl ................. B60T 1/10 701/36 |
| 2014/0088810 A1* | 3/2014 | Gehring ............... B60W 10/06 701/22 |
| 2014/0114514 A1* | 4/2014 | Crombez ............ B60W 10/06 701/22 |
| 2014/0148986 A1* | 5/2014 | Yoshikawa ........... B60W 20/10 701/22 |
| 2014/0244120 A1 | 8/2014 | Fujii |
| 2015/0046076 A1 | 2/2015 | Costello |
| 2016/0109328 A1 | 4/2016 | Kanke |
| 2016/0137185 A1 | 5/2016 | Morisaki |
| 2016/0200315 A1 | 7/2016 | Fracchia |
| 2016/0243947 A1* | 8/2016 | Perkins ................... B60L 1/003 |
| 2016/0243958 A1* | 8/2016 | Miller ................ B60L 11/1816 |
| 2016/0244044 A1* | 8/2016 | Miller .................. B60W 10/06 |
| 2016/0264144 A1 | 9/2016 | Fontvieille |
| 2017/0021730 A1* | 1/2017 | Ogawa ..................... B60L 7/20 |
| 2017/0021820 A1* | 1/2017 | Ogawa ................ B60L 11/1861 |
| 2017/0021823 A1* | 1/2017 | Ogawa .................. B60W 20/12 |
| 2017/0355358 A1* | 12/2017 | Ogawa .................... B60L 11/14 |
| 2018/0001884 A1 | 1/2018 | Itagaki |
| 2018/0010529 A1 | 1/2018 | Xiao |
| 2018/0065619 A1 | 3/2018 | Kim |
| 2018/0073593 A1 | 3/2018 | Kawamura |
| 2018/0093655 A1* | 4/2018 | Healy .................. B60W 20/12 |
| 2018/0162382 A1 | 6/2018 | Colavincenzo |
| 2018/0178774 A1 | 6/2018 | Katsumata |
| 2018/0236994 A1* | 8/2018 | Healy .................. B60W 20/14 |
| 2018/0257473 A1* | 9/2018 | Follen ..................... B60K 6/20 |

* cited by examiner

NAVIGATION-ENHANCED BATTERY STATE OF CHARGE MAINTENANCE

TECHNICAL FIELD

The present disclosure relates generally to adjusting the state of charge (SOC) of a hybrid vehicle's battery. In some embodiments, navigation/location information is used identify and characterize an upcoming downhill section of roadway in order to adjust the battery's SOC prior so that a desired SOC can be achieved upon traversing the downhill section.

DESCRIPTION OF RELATED ART

Hybrid vehicles have become increasingly popular among consumers concerned with their environmental impact and with increasing fuel economy. Hybrid vehicles generally utilize an engine, e.g., an internal combustion engine, along with an electric motor, which can also operate as a generator to provide energy to a battery that powers the electric motor. Hybrid vehicles can use an engine clutch that connects/disconnects the engine to/from a drivetrain. The drivetrain can include the engine and electric motor, and a transmission coupled to the electric motor for transmitting power from the engine, electric motor, or both.

Conventional hybrid vehicles may use various methods of controlling battery SOC. However, the battery SOC control methods used in conventional hybrid vehicles do not treat towing conditions differently from non-towing conditions. Moreover, battery SOC control methods used in conventional hybrid vehicles do not accurately determine how road conditions, such as downgrades, impact battery SOC while towing. Accordingly, the methods of controlling battery SOC in conventional hybrid vehicles may allow a conventional hybrid vehicle to reach a full battery SOC condition even before the end of downgrade has been reached. If engine braking alone is insufficient to properly decelerate a hybrid vehicle and its tow load, the full battery SOC condition prevents the motor from assisting with deceleration, forcing the driver to engage the hybrid vehicle's friction brakes.

BRIEF SUMMARY OF THE DISCLOSURE

In accordance with one embodiment, a method comprises determining a vehicle is approaching a downgrade, and determining relevant mass of the vehicle and road load associated with the vehicle. The method may further comprise calculating potential kinetic energy available from the downgrade based upon the relevant mass and road load associated with the vehicle, and one or more characteristics of the downgrade. Further still, the method may comprise depleting a battery of the vehicle such that upon completing travel of the downgrade, a desired battery state of charge is achieved through at operation a motor of the vehicle in a regenerative braking travel mode relative to the potential kinetic energy available from the downgrade.

In some embodiments, the vehicle comprises a hybrid electric vehicle comprising at least one internal combustion engine and at least one electric motor providing drive power to the vehicle.

In some embodiments, determining that the vehicle is approaching the downgrade comprises obtaining navigational information indicative of road conditions of a route along which the vehicle is traveling.

In some embodiments, the navigation information comprises at least the one or more characteristics of the downgrade.

In some embodiments, the vehicle is towing a load.

In some embodiments, determining the relevant mass of the vehicle comprises calculating the relevant mass based upon a drivetrain force of the vehicle and acceleration of the vehicle while traveling along a level section of roadway at a first speed. In some embodiments, determining the road load associated with the vehicle comprises calculating the road load based upon the relevant mass of the vehicle, a drivetrain force and acceleration of the vehicle while traveling along a level section of the roadway at a second speed that is greater than the first speed.

In some embodiments, calculating the potential kinetic energy available from the downgrade comprises determining gravitational force that would be experienced by the vehicle while traveling along the downgrade based upon at least the relevant mass of the vehicle.

In some aspects, the one or more characteristics of the downgrade comprise at least a grade angle of the downgrade, a duration the vehicle will travel along the downgrade, and a distance from a current location of the vehicle to a starting point of the downgrade. In some aspects, the potential kinetic energy is translated in an amount of electrical energy available from the downgrade for recharging the battery of the vehicle.

In some embodiments, the method further comprises calculating the amount the battery is to be depleted by determining a difference between the desired battery state of charge and the electrical energy available from the downgrade.

In some embodiments, the method further comprises determining whether the difference between the electrical energy available from the downgrade and the desired battery state of charge will result in the battery reaching the desired battery state of charge prior to completing travel of the downgrade. In some embodiments, the method may further comprise correlating the amount of electrical energy available from the downgrade to an amount of positive motor torque to be generated by the motor of the vehicle prior to reaching a starting point of the downgrade. In some aspects, the positive motor torque generated by the motor of the vehicle provides a mechanism for the depletion of the battery.

In some embodiments, the desired battery state of charge comprises one of a fully charged condition and a non-fully charged condition, the amount of remaining charge being determined based upon one or more subsequent road conditions to be traveled by the vehicle.

In some embodiments, the method comprises enabling one or more electrically-driven accessories of the vehicle to deplete the battery of the vehicle when the vehicle is operating in an engine-on travel mode.

In accordance with another embodiment, a hybrid vehicle comprises: an internal combustion engine; an electric motor operatively connected in parallel to the internal combustion engine; and an electronic control unit. The electric control unit is adapted to obtain navigational information regarding a downgrade that is upcoming on a route being traveled by the hybrid vehicle. The electric control unit is adapted to operate the hybrid vehicle to deplete a battery providing electrical energy to the electric motor prior to traversing the downgrade. The electric control unit is adapted to operate the hybrid vehicle in an electric motor-on travel mode while traversing the downgrade to recharge the battery to a desired battery state of charge upon the hybrid vehicle completing its traversal of the downgrade, wherein an amount by which the battery is depleted is based upon one or more characteristics of the downgrade.

In some embodiments, the electronic control unit comprises a navigational unit adapted to obtain the navigational information from one or more of a positioning sensor and network-provided navigational information. In some embodiments, the electronic control unit comprises a target driving force calculation component adapted to determine the amount by which to deplete the battery based upon potential kinetic energy attributable to effects of gravity when traversing the downgrade. In some embodiments, the potential kinetic energy is recouped as electrical energy recouped by the battery of the vehicle.

In some embodiments, the electronic control unit is adapted to operate the hybrid vehicle to deplete the battery by at least one of operating the electric motor, and enabling one or more battery-powered accessories of the hybrid vehicle prior to the hybrid vehicle traversing the downgrade to draw current from the battery.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments of the present disclosure are directed to adjusting a battery SOC of a hybrid vehicle towing a load, such as a trailer, prior to traversing a downgrade. In particular, navigation and/or location information regarding upcoming road conditions, such as a downgrade can be received by the hybrid vehicle. The relevant mass of the hybrid vehicle and road load associated with the hybrid vehicle may be determined. The relevant mass of the hybrid vehicle can include the mass of the hybrid vehicle in addition to the mass of the hybrid vehicle's load. It should be noted that although various embodiments described herein are in the context of hybrid vehicles, adjusting battery SOC in the manner disclosed may also be applied in the context of electric-only vehicles.

The potential kinetic energy (which can be translated to electrical energy in an electric motor for charging a battery) available from the downgrade may also be determined. This determination can be based on one or more characteristics of the downgrade, the relevant vehicle mass, and the road load associated with the hybrid vehicle. The difference between the electrical energy available as a result of downgrade (i.e., the impact of gravity) and the electrical energy of a battery in a full (or other desired) battery SOC can be calculated. If this difference will result in a full battery SOC condition before reaching the end of the downgrade, the battery is depleted from a current SOC by this calculated amount of electrical energy to account for the difference. Depletion of the battery can occur prior to reaching the downgrade. For example, the electric motor can use positive torque to assist the engine prior to a downhill grade to deplete battery SOC. Thus, the battery SOC upon reaching the end of the downgrade will be full, or will reach some desired battery SOC.

Figure 1A:
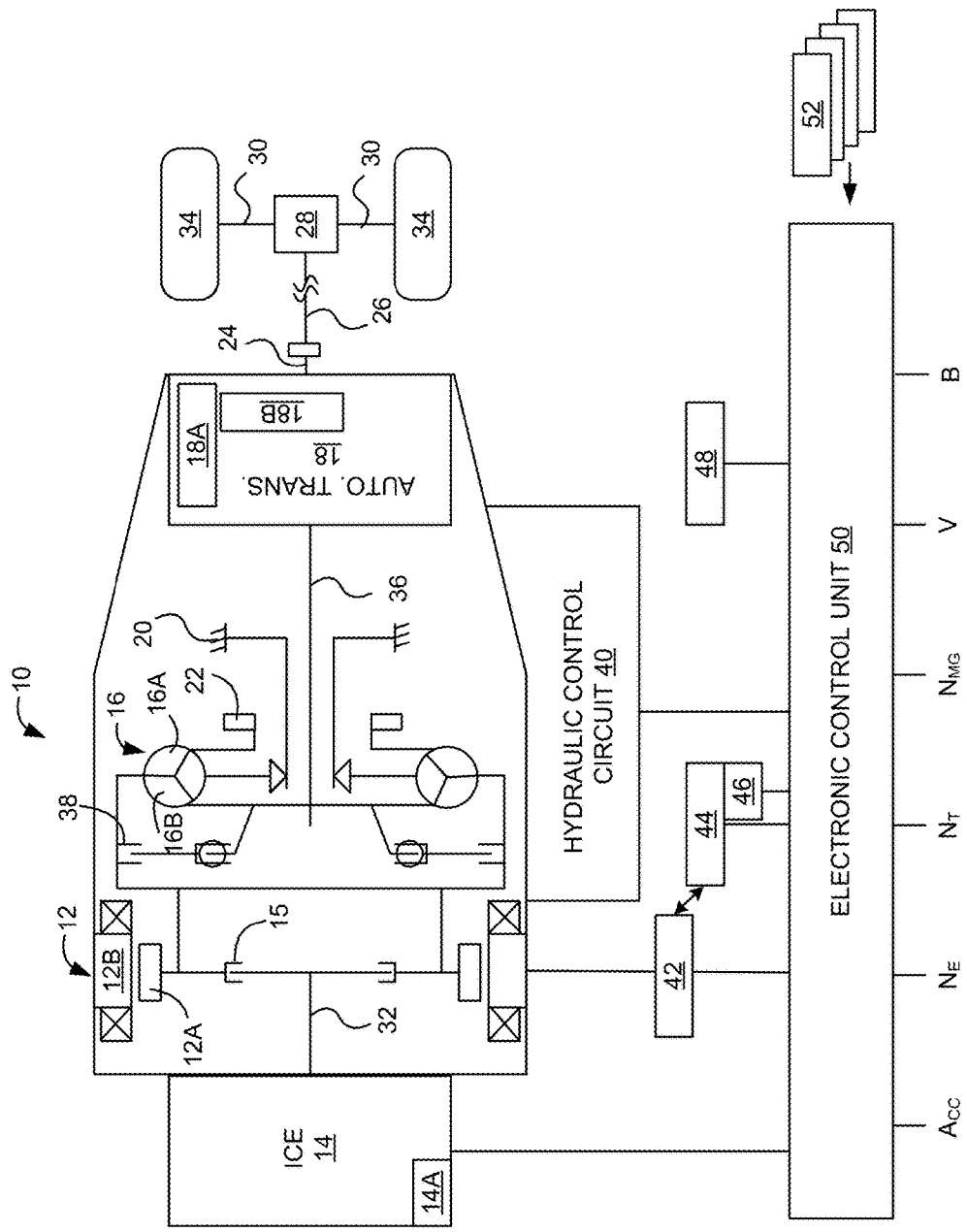
FIG. 1A is a schematic representation of a hybrid vehicle in which deceleration control can be implemented in accordance with various embodiments of the present disclosure.

FIG. 1A is a schematic representation of an example hybrid vehicle 10 in which deceleration control in accordance with various embodiments may be implemented. It should be noted that for clarity of the illustration, not all elements of hybrid vehicle 10 are labeled with a reference numeral. For example, in some cases, only one of two or more elements or components of hybrid vehicle 10 are labeled with a reference numeral. However, it can be assumed that the functionality and/or operation of similarly-illustrated elements or components are the same or similar, as would understood by those of ordinary skill in the art unless described otherwise. Moreover, aspects of hybrid vehicle 10 may be described from the perspective of one/one set of elements or components. It can be assumed that secondary instances of those elements or components may operate the same or in a similar manner. It should also be noted that for ease of description and clarity of figures, not all components of a hybrid vehicle have been illustrated, and that the figures and corresponding descriptions are not meant to be limiting. It should be further noted that a hybrid vehicle may embody certain variations with respect to its elements or components, which are contemplated herein. For example hybrid vehicle 10 may be configured with only a single motor.

FIG. 1A includes an example drive system of a hybrid vehicle 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case 20. The transmission case 20 may be a splittable case made of aluminum die cast parts, for example, and fixed to a non-rotating member such as a vehicle body.

Hybrid vehicle 10 may be driven/powered with at least one of the engine 14 and the motor 12 as the drive source for travel. In other words, any one of a plurality of travel modes can be selectively established in the hybrid vehicle 10. A first travel mode may be an engine-only travel mode that only uses the engine 14 as the drive source for travel. A second travel mode may be an EV travel mode that only uses the motor 12 as the drive source for travel. A third travel mode may be an HEV hybrid travel mode that uses the engine 14 and the motor 12 as drive sources for travel. In the engine-only and HEV travel modes, hybrid vehicle 10 travels by using the driving force generated at least by engine 14 while a clutch 15 is engaged. In EV travel mode, hybrid vehicle 10 travels by using the driving force generated by motor 12 while the engine 14 is stopped and clutch 15 is disengaged.

Engine 14 can be an internal combustion engine such as a gasoline engine or a diesel engine of an in-cylinder injection type, where fuel is injected directly into a combustion chamber. An output control device 14A is provided to control drive (output torque) of the engine 14. The output control device 14A includes a throttle actuator that controls opening and closing of an electronic throttle valve, a fuel injection device that controls fuel injection, an ignition device that controls ignition timing, and the like. The output control device 14A executes output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A lock-up clutch 38 that directly connects a pump impeller 16A and a turbine wheel 16B so that they can integrally rotate is provided between pump impeller 16A and the turbine wheel 16B of torque converter 16. The lock-up clutch 38 can be controlled such that its engagement state becomes any one of engagement (complete engagement), slip engagement, and disengagement (complete disengagement) according to hydraulic pressure supplied from a hydraulic control circuit 40. A mechanical hydraulic pump 22 is coupled to the pump impeller 16A of the torque converter 16, and hydraulic pressure generated by hydraulic pump 20 is supplied to hydraulic control circuit 40 as source pressure along with rotation of the pump impeller 16A. Turbine wheel 16B may be coupled to a transmission input shaft 36 that transfers power from motor 12 and/or engine 14 to automatic transmission 18 to which a transmission output shaft 24 is attached. Connected to transmission output shaft 24 is a propeller shaft 26 coupled to differential gear device 28.

Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches 18B and brakes 18A whose engagement is controlled by a hydraulic actuator. These hydraulic frictional engagement devices are selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor 12A and a stator 12B. Rotor 12A can be rotatably supported around an axis by the transmission case 20. Stator 12B can be integrally fixed to the transmission case 20 on an outer peripheral side of the rotor 12A. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below controls inverter 42, adjusts driving current supplied to or received from coils of the motor 12, and controls driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to the rotor 12A of the motor 12 via clutch 15. Rotor 30 of the motor MG is coupled to a front cover that is an input member of the torque converter 16. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

Hybrid vehicle 10 may include an electronic control unit 50. Electronic control unit 50 may include a microcomputer that includes a CPU, a RAM, a ROM, an input-output interface, and the like. In electronic control unit 50, the CPU utilizes a temporary storage function of the RAM to perform signal processing according to a program in advance stored in the ROM. Accordingly, the electronic control unit 50 executes various kinds of control such as drive control of the engine 14, drive control of the motor 12, speed change control of the automatic transmission 18, engagement force control of the clutch 15, engagement control of the lock-up clutch 38, and the like. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the hybrid vehicle 10.

As shown in FIG. 1A, the electronic control unit 50 is supplied with various kinds of input signals detected by each sensor provided in the hybrid vehicle 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and energy storage amount (remaining capacity, charged amount), e.g., battery SOC of battery 44. It should be noted that more signals indicative of other operational aspects of hybrid vehicle 10 can be received by electronic control unit 50, e.g., a temperature of motor 12, coolant temperature of hybrid vehicle 10, intake air amount of engine 14, etc.

Electronic control unit 50 can receive the input signals from various sensors 52 configured to sense relevant operational characteristics of hybrid vehicle 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_E$ can be detected by an engine revolution speed sensor. The turbine rotational speed $N_T$ can be detected by a turbine rotational speed sensor. The motor rotational speed $N_{MG}$ can be detected by a motor rotational speed sensor. Vehicle speed V can be detected by a vehicle speed sensor. Battery SOC can be detected by an SOC sensor 46. Another example of a sensor 52 may be a positioning or location sensor, such as a Global Positioning System (GPS) receiver that can provide location information corresponding to a location of hybrid vehicle 10.

Additionally, electronic control unit 50 can receive input signals from a network interface device 48. Network interface device 48 may receive information such as map data, road conditions information (e.g., upcoming road slope/grade information, upcoming turn information, etc.), traffic information, and the like from one or more information service providers. Instead of relying solely on a GPS receiver, a location of hybrid vehicle 10 may be determined from information received by network interface device 48.

Electronic control unit 50 can supply various output signals to one or more devices/components/elements provided in hybrid vehicle 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15. Electronic control unit 50 can also supply signals to the linear solenoid valve in the hydraulic control circuit 40 for engagement control of the lock-up clutch 38, line pressure control, and the like.

Figure 1B:
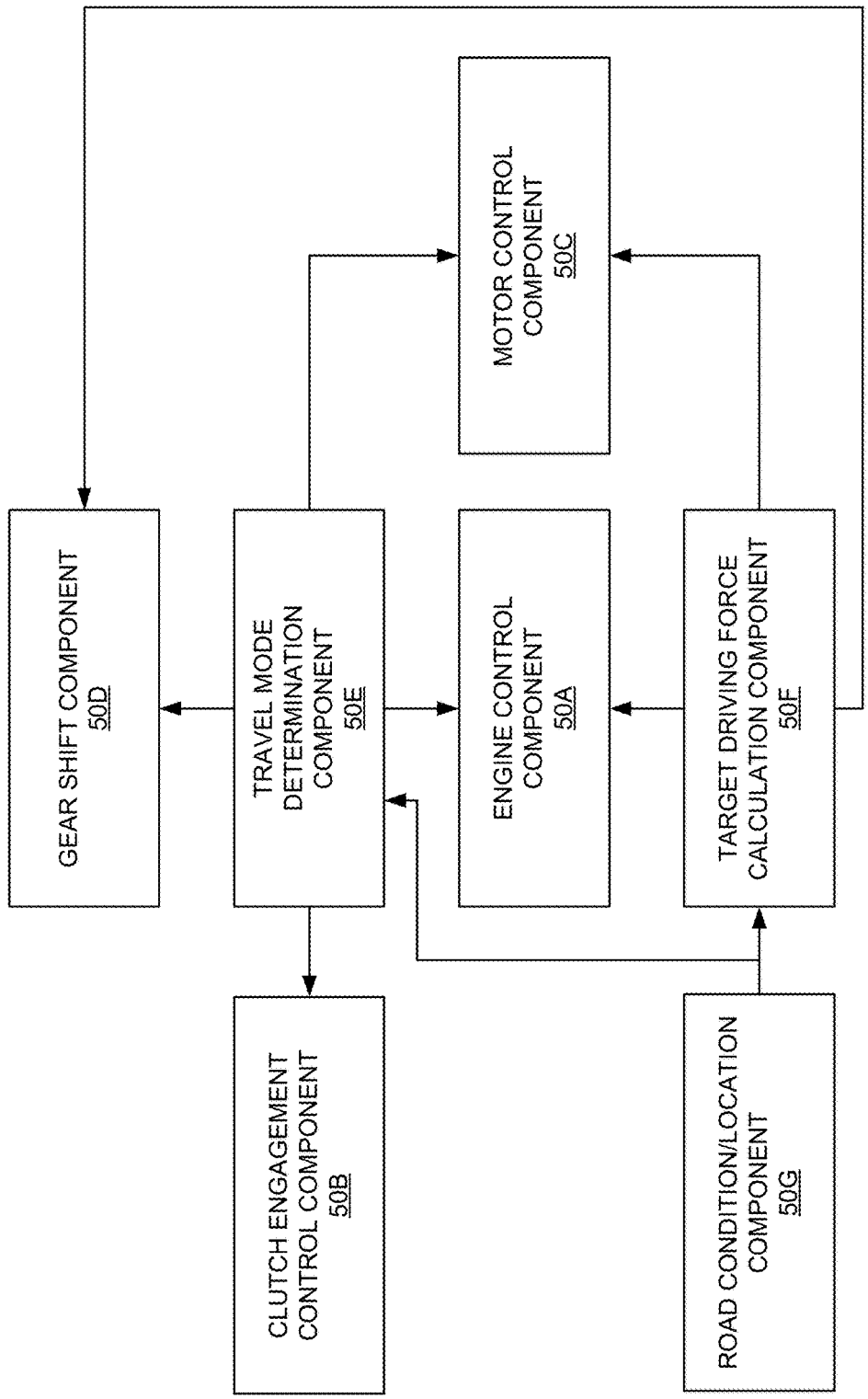
FIG. 1B is a functional block diagram illustrates component parts of a control function included in an electronic control unit of the hybrid vehicle illustrated in FIG. 1A.

FIG. 1B is a functional block diagram that illustrates example parts of a control function included in the electronic control unit 50. An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and HEV travel modes. For example, engine control component 50A may control when engine 14 is started, e.g., when switching from EV travel mode to the engine-only travel mode or the HEV travel mode. This can occur when hybrid vehicle is transitioning from the EV travel mode to the HEV travel mode. Likewise, engine control component 50A may control when engine 14 is shut off, e.g., when switching from engine-only or HEV travel mode to EV travel mode.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve resulting in an engine revolution speed $N_E$, and the supply of fuel to engine 14 is started via the output control device 14A.

When hybrid vehicle 10 is to be operated in EV mode, as can be done when traveling downhill, for example, engine control component 50A outputs a control signal(s) to output control device 14A for stopping engine 14. Clutch 15 may be disengaged, and engine 14 is stopped. Moreover, output control device 14A may be commanded to stop the supply of fuel to engine 14.

As alluded to previously, clutch engagement control component 50B performs engagement control of the clutch 15 via the linear solenoid valve included in the hydraulic control circuit 40 by controlling current supplied to the linear solenoid valve. The hydraulic pressure supplied from the linear solenoid valve to the hydraulic actuator included in the clutch 15 as a result of the supplied current effectuates engagement/disengagement of the clutch 15.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that hybrid vehicle 10 decelerates.

In some embodiments, in order to optimize conditions for regenerative braking, hybrid vehicle 10 may be downshifted to a lower gear to increase the magnitude of engine braking/regenerative braking. A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in hybrid vehicle 10 or on the basis of a target driving force, described below. A determination can be made regarding which travel mode (EV, engine-only, HEV) hybrid vehicle is in on the basis of, e.g., vehicle speed V, accelerator operation amount $A_{CC}$, battery SOC of battery 44, brake operation amount B, etc. For example, if the battery SOC of battery 44 indicates a low state of charge, travel mode determination component 50E may determine a need to switch from an EV/HEV travel mode to an engine-only travel mode. In some embodiments described below, travel mode determination component 50E is commanded to switch from an engine-only/HEV travel mode to an HEV/EV travel mode in order to purposely deplete battery 44 in anticipation of a road condition, e.g., an upcoming downhill grade.

A road conditions/location component 50G can make determinations regarding a location of hybrid vehicle 10, as well as upcoming road conditions. In one embodiment, road conditions/location component 50G may embody a navigation unit commonly found in many modern vehicles, hybrid or otherwise. Road conditions/location component 50G may receive information regarding road conditions from network interface device 48 and/or a GPS receiver, which may be one embodiment of a sensor 52. For example, the location of hybrid vehicle at any point during its travel can be determined, e.g., by the GPS receiver, and this location can be correlated with road conditions information relevant to that location.

For example, upon startup or during operation of hybrid vehicle 10, road conditions/location component 50G may determine a route to be traveled is known. The route may be known if an address, point of interest identifier, etc. is provided to a road conditions/location component 50G, for example, by a driver of hybrid vehicle 10, via navigation system user interface. Road conditions/location component 50G may have or receive maps or map information indicative of the route to be traveled along with road conditions, e.g., any downhill grades present/expected along the route.

If the route is not known, road conditions/location component 50G may predict a route. Route prediction methods and systems are known in the art, and any of a variety of route prediction systems or methods can be used to predict the route in accordance with various embodiments. In some embodiments, the road conditions/location component 50G and/or the GPS receiver will predict one or more potential routes and a likelihood of each predicted route. For example, if the likelihood of a first route being correct is 80 percent (80%) and the likelihood for each of 4 other routes is 5 percent (5%), the road conditions/location component 50G can assume that the route will be the first route. Road conditions/location component 50G can, in conjunction with target driving force calculation component 50F, control the operation of engine 14 and/or motor 12 to deplete battery 44. This can be done, for example, to maintain a battery SOC in which battery 44 may always have capacity to receive regenerative braking energy when going downhill, and especially when going downhill towing a load.

The target driving force calculation component 50F, as described below, can determine whether or not battery 44 should be depleted in anticipation of an upcoming downhill grade. If the route is not known, road conditions/location component 50G may make calculations to determine an appropriate amount by which battery 44 should be depleted with regard to any/all/the most likely/predicted routes having one or more downhill grades. Target driving force calculation component 50F may select or implement a particular battery depletion strategy appropriate to the route being traveled by hybrid vehicle 10.

Road conditions/location component 50G may determine whether hybrid vehicle 10 is approaching a downgrade based on data stored in a memory (such as map data), data received via a network interface device 48 (such as streaming map data, periodic local travel information), or data detected by one or more sensors (such as an accelerometer, a camera or the like). In some embodiments, the road conditions/location component 50G may determine that hybrid vehicle 10 is approaching a downgrade when hybrid vehicle 10 is within a predetermined distance of the downgrade such as 2 miles, 1 mile, ½ of a mile, ¼ of a mile, ¹⁄₁₀ of a mile, or within any other predetermined distance. Road conditions/location component 50G may determine whether data corresponding to the downgrade is known. For example, the data may include a grade (or multiple grades, also known as the slope or gradient) of the downgrade, a length of the downgrade, or other data characterizing the downgrade. Depending on how far away hybrid vehicle 10 is from the downgrade, as well as the aforementioned characteristics of the downgrade, target driving force calculation component 50F described below, can determine an appropriate amount by which to deplete battery 44.

Target driving force calculation component 50F can calculate a target driving force on the basis of a vehicle state. For example, the target driving force calculation component 50F can deduce (calculate) a target driving force that is a target value of the driving force to be transmitted to wheels 34, e.g., on the basis of a detected accelerator operation amount $A_{CC}$, detected vehicle speed V, and the like. Target driving force calculation component 50F may output control signals to one or more of engine control component 50A and motor control component 50C to control the drive of engine 14 and the action of motor 12 to achieve the target driving force. In an engine-on/HEV mode, the engine control component 50A controls the drive of the engine 14 with the target driving force calculated by the target driving force calculation component 50F as the target engine output. In a EV/HEV mode, motor control component 50C controls driving motor 12 with the target driving force calculated by target driving force calculation component 50F.

In accordance with various embodiments, target driving force calculation component 50F can calculate a target driving force depending on the characteristics of an upcoming downgrade and how far away hybrid vehicle 10 is from the upcoming downgrade. Based on this information, target driving force calculation component 50F can determine how much electrical energy will be generated by hybrid vehicle 10 traversing the downgrade. The amount of electrical energy that will be generated going downhill is the amount of electrical energy that should be dissipated by battery 44. In this way, by the time hybrid vehicle 10 reaches/begins traveling downhill, the battery SOC of battery 44 will be in a condition to be completely replenished by the time hybrid vehicle 10 reaches the end of the downgrade. Accordingly, a regenerative braking travel mode can be leveraged to recharge battery 44, while at the same time, maintaining some margin of the battery SOC to allow for motor 12 to generate negative motor torque for decelerating hybrid vehicle 10.

In some embodiments, motor 12 can assist engine 14 in decelerating hybrid vehicle 10. This can be especially useful when hybrid vehicle 10 is towing a load with enough mass such that engine braking using engine 14 may be insufficient to prevent/prevent excessive acceleration while going downhill. This is also useful when hybrid vehicle 10 is, e.g., towing a load, going downhill, and traveling with enough speed such that the air resistance on hybrid vehicle 10 is not high enough to slow hybrid vehicle 10 down sufficiently. Additionally, the potential for overcharging battery 44, which can be harmful, e.g., to the longevity of battery 44, is avoided.

In some embodiments, it may be advantageous to have a battery SOC that is not in a fully charged condition. For example, road conditions/location component 50G may determine that the route along which hybrid vehicle 10 is traveling includes one or more additional downgrades that should be taken into account. For example, there may not be a flat/upgrade section of the roadway during which battery 44 can be depleted sufficiently prior to encountering the subsequent downgrade(s).

In order to determine the amount of electrical energy that can be accumulated during a downgrade, target driving force calculation component 50F make the following calculations.

As alluded to above, the relevant mass of hybrid vehicle 10 may be taken into account. Generally, vehicle mass can be calculated while a vehicle is traveling at a relatively low speed in accordance with the following equation. In some embodiments, vehicle mass can be calculated while the vehicle speed is between approximately 0 to 30 kph.

$$Force_{drivetrain} = mass * acceleration$$

In some embodiments, the relevant mass of hybrid vehicle 10 can be determined based on the drivetrain force, e.g., torque at wheels 34, and the acceleration being experienced by hybrid vehicle 10 (and any towed load). In some embodiments, the relevant vehicle mass includes the mass of hybrid vehicle 10 and that of a towed load, e.g., a trailer, being hauled by hybrid vehicle 10. Torque at wheels 34 can be determined by receiving one or more signals from one of sensors 52 capable of determining the torque at wheels 34. In some embodiments, torque at wheels 34 can be calculated by determining torque output by motor 12 and multiplying that output torque by a torque multiplication factor of torque converter 16 in a current gear in which automatic transmission 18 is operating. Acceleration can be determined by an accelerometer which may be embodied as one of sensors 52.

Road load is another factor or variable that can be considered. Generally, road load is determined while hybrid vehicle is traveling at relatively higher speeds in accordance with the following equation.

$$\text{Force}_{drivetrain} - \text{Force}_{road\_load} = \text{mass} * \text{acceleration}$$

Here, the force or resistance experienced by hybrid vehicle 10 can be calculated based on the previously calculated relevant mass of hybrid vehicle 10. That is, the drivetrain force can be calculated and acceleration can be determined as described above. Knowing the relevant mass of hybrid vehicle 10, the road load force can be determined. Road load can refer to the resistance experienced/force imparted by a vehicle while traveling at some constant speed over a level surface. The resistance can be attributed to various factors, including but not limited to, air resistance or drag, the resistance or friction of the wheels of the vehicle contacting the road, drivetrain losses, etc. A road load curve can be interpolated based upon the above calculations, so that at any speed or velocity, the road load associated with hybrid vehicle 10 can be determined. Road load can impact the target driving force inasmuch as it provides resistance that the target driving force must overcome and/or may add to negative target driving force.

The force of gravity that impacts hybrid vehicle 10 while traversing an upcoming downgrade can be calculated as follows.

$$\text{Force}_{grade} = \text{mass} * \text{gravity} * \sin(\text{angle of slope})$$

As noted above, a particular downgrade may include a plurality of grades. Accordingly, the force attributable to the slope of the downgrade can be calculated for each section or segment of the downgrade. Determining the force given a particular grade allows the impact of gravity to be accounted for.

A duration of a downgrade can be determined as follows.

$$\text{Time}_{segment} = \text{distance}/\text{velocity}$$

The distance of a particular downgrade can be determined by way of the map/map information or other information received by road conditions/location component 5G. In a case where multiple grades make up a particular downgrade, the amount of electrical energy that can be recaptured can be calculated for each section or segment of the downgrade based on the distance or length of each segment of the downgrade and the velocity of hybrid vehicle 10. Velocity of hybrid vehicle 10, in some embodiments, can be assumed to the speed limit for that segment of road.

The additional power (attributed to gravity) needed to maintain the current velocity at which hybrid vehicle 10 is traveling can be determined as follows.

$$\text{Power}_{gravity} = (\text{Force}_{grade} - \text{Force}_{road\_load}) * \text{velocity}$$

The amount of electrical energy may then be determined in view of the power of gravity according to the following equation.

$$\text{Energy}_{gravity} = \text{Power}_{gravity} * \text{Time}_{segment}$$

Given the electrical energy that can be attributed to the effects of gravity while traveling along the upcoming downgrade, the amount of charge needed by battery 44 to offset the additional electrical energy that will be recuperated from the downgrade can be determined. This amount of charge may then be depleted prior to traveling the downgrade. In particular, the amount of offset charge or offset SOC can be determined from the following equation.

$$\Delta SOC = \text{Energy}_{gravity} / \text{Energy}_{max\_battery\_charge}$$

It should be noted that in some embodiments, as alluded to above, the difference in SOC may be determined from an energy level commensurate with a non-maximum/non-fully-charged battery SOC condition. Thus, in some embodiments, $\text{Energy}_{max\_battery\_charge}$ may be replaced with $\text{Energy}_{desired\_battery\_charge}$. For example, road conditions/location component 50G may determine that another downgrade is part of the route, and that there is not a large or long enough segment of level/upgrade roadway during which battery 44 can be depleted. Accordingly, battery 44 may be left in a semi-depleted battery SOC condition rather than a fully charged battery SOC condition upon coming to the end of a downgrade. The same/similar calculations and determinations as those described above can be used to determine the requisite difference in battery SOC. In order to determine the degree to which battery SOC is depleted, the amount of battery SOC that will be gained during a downgrade can be calculated. Accordingly, at some distance away from an upcoming downgrade, e.g., three miles ahead (although this can vary depending upon how much the battery SOC should be depleted), the target SOC is changed to meet the required depletion. In some embodiments, motor torque may be used to assist the engine to deplete the battery (and the engine uses less fuel).

If the difference in SOC (ΔSOC) will cause battery 44 to be in a fully charged condition, target driving force calculation component 50G can determine a target driving force, i.e., positive motor torque, needed to discharge battery 44. The amount that battery 44 is to be discharged is that amount that will allow for battery 44 to be recharged through regenerative braking while traveling the upcoming downgrade.

It should be noted that in some embodiments, rather than making calculations based on each segment of a downgrade, an average grade may be determined. Appropriate calculations to determine downgrade duration, grade force, etc., can be made using this average grade. The average grade can be determined by road conditions/location component 50G by analyzing the segments of an upcoming downgrade and computing an average gradient. It should be further noted that in some embodiments, the aforementioned calculations and determinations can be made each time hybrid vehicle 10 is approaching a downgrade. However, in some embodiments, these calculations and determinations may be stored in a memory unit of hybrid vehicle 10 or accessible by hybrid vehicle 10. In some embodiments, these calculations and determinations may alternatively, or in addition, be uploaded via network interface device 48 to one or more of the aforementioned information service providers, a centralized data repository, etc. In some embodiments, the centralized data repository can be accessed by other vehicles. In this way, upon determining one or more characteristics of an upcoming downgrade, those characteristics can be used to obtain relevant energy calculations and determinations so that battery SOC can be appropriately deleted. In some cases, the calculations and determinations may be relevant for hybrid vehicle 10 re-traveling the downgrade or other vehicles traveling/re-traveling the downgrade. In some cases, the calculations and determinations may be relevant for similar downgrades that hybrid vehicle 10 and/or other vehicles may encounter. In this way, processing resources can be saved and/or the time to determine a battery depletion strategy can be reduced.

It should be understand that the above determination is only an example, and those of ordinary skill in the art would know of and could apply other methods of determining the amount of electrical energy that may be captured while traveling along one or more downgrades.

Figure 2:
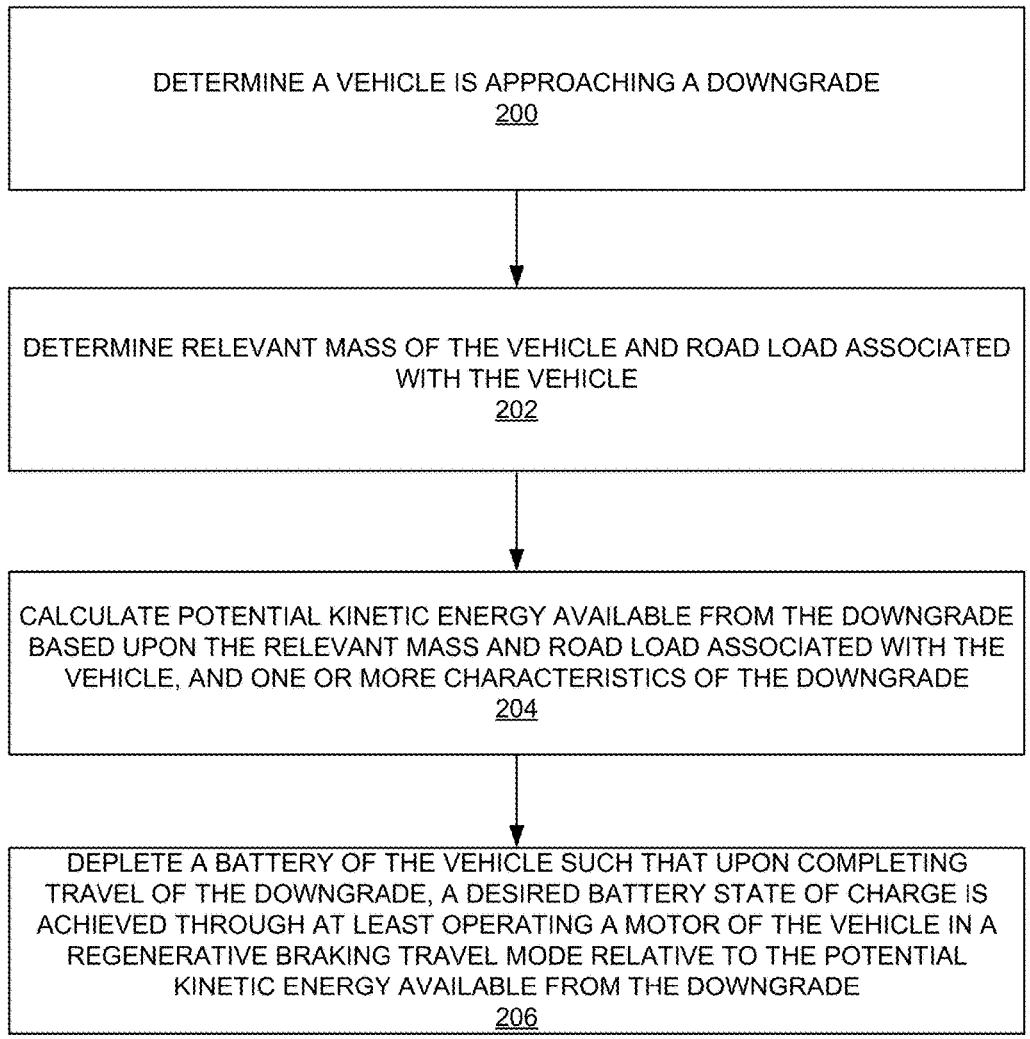
FIG. 2 is a flow chart illustrating example operations that can be performed to control battery SOC in accordance with various embodiments of the present disclosure.

FIG. 2 is a flow chart illustrating example operations for controlling battery SOC in accordance with various embodiments of the present disclosure. At operation 200, a determination is made regarding whether a vehicle is approaching a downgrade. As described above, this determination can be made in view of road conditions/location information determined by hybrid vehicle 10 and/or received by hybrid vehicle 10 through road conditions/location component 50G. At operation 202, a relevant mass of the vehicle and road load associated with the vehicle can be determined. The relevant mass of the vehicle includes that of the vehicle itself, as well as the mass of any load that the vehicle may be towing, such as trailer, camper, secondary vehicle, etc. The road load characterization of the vehicle may also take into account any load that is being hauled by the vehicle. At operation 204, the potential kinetic energy available from the downgrade is calculated based upon the relevant mass and road load associated with the vehicle, and one or more characteristics of the downgrade. The potential kinetic energy available from the downgrade can be translated into electrical energy that can be recouped by a battery of the vehicle as it travels along the downgrade. If the downgrade is not consistent, the downgrade can be considered in terms of individual sections or segments that make up the downgrade. In some embodiments, the calculation of available kinetic energy may be performed for each segment. In some embodiments, the calculation of available kinetic energy may be performed using averaged characteristics of the individual segments making up the overall downgrade. At operation 206, a battery of the vehicle is depleted such that upon completing travel of the downgrade, a desired battery SOC is achieved through at least operating a motor of the vehicle in a regenerative braking travel mode relative to the potential kinetic energy available from the downgrade. That is, the amount of kinetic energy (translated into electrical energy that can be recouped) is used to determine an amount of force a motor of the vehicle must generate to deplete that amount of kinetic energy. Prior to reaching the downgrade, the motor can be operated to generate this amount of force to offset the recouping of electrical energy that will occur while traveling the downgrade.

Figure 3:
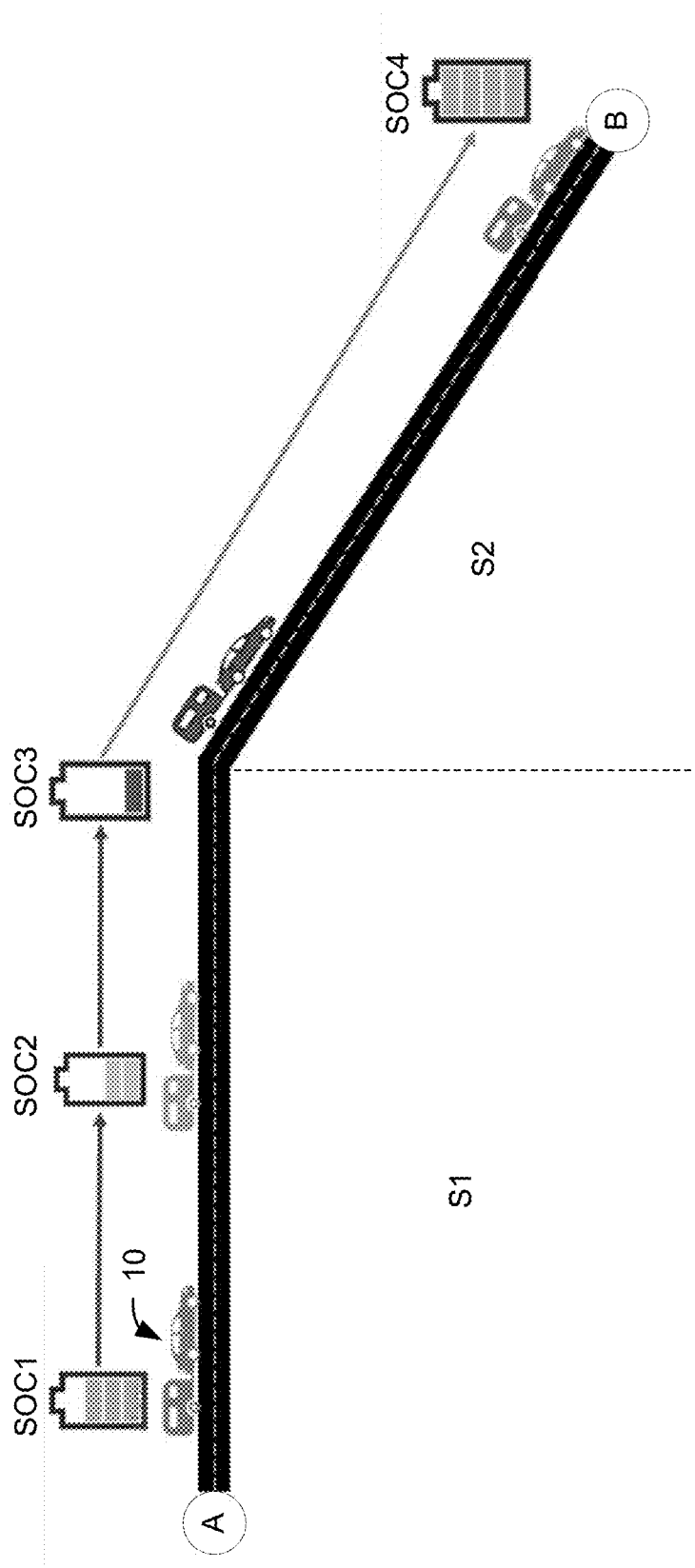
FIG. 3 illustrates an example use of various embodiments of the present disclosure.

FIG. 3 illustrates an example application of battery SOC control in accordance with one embodiment. At a point A, hybrid vehicle 10 may determine or receive information that it is approaching a downgrade some distance ahead, e.g., it is traveling a segment of roadway 51, and is approaching a downgrade segment of roadway S2. For example, hybrid vehicle 10 may receive, through network interface device 48 map information identifying the upcoming downgrade as well as its characteristics, e.g., length of the downgrade, grade of the slope, etc. If not previously done, the relevant mass of hybrid vehicle 10 (including that of its towed load, which in this example is a recreational vehicle (RV) trailer) can be determined. At this point, again, if not yet determined the road load associated with hybrid vehicle 10 can be determined.

As previously noted, mass is generally determined while a vehicle is traveling at a relatively low speed, while road load can be determined while the vehicle is traveling at a relatively high speed upon which a road load curve can be interpolated. Accordingly, determining road load in this example may be performed by accessing the calculated and/or interpolated road load data to determine a relevant road load. In some cases, the length of time/distance to the beginning of a downgrade may allow for the speed variance needed to determine relevant mass and road load.

Depending on how long it will take for hybrid vehicle 10 to reach the downgrade, a determination can be made to deplete its battery to a battery SOC level enough to offset an amount of charge it will recoup upon traversing the downgrade. Accordingly, FIG. 3 illustrates that at or near point A, the battery SOC of hybrid vehicle 10 may be, e.g., approximately 80% full. As hybrid vehicle 10 travels towards the downgrade (the beginning of segment S2), it begins to deplete its battery unit. By the time it reaches the downgrade at segment S2, the battery can be in a near-depleted battery SOC condition. However, as hybrid vehicle 10 begins to travel downhill along the downgrade, it enters a regenerative braking mode.

Referring back to FIG. 1A, travel mode determination component 50E can determine hybrid vehicle is traveling a downgrade. This determination can be based on, e.g., acceleration and/or speed data, and/or, e.g., information from road condition/location component 50G that hybrid vehicle has reached a downgrade. Accordingly, travel mode determination component 50E can determine that hybrid vehicle 10 should be operating in an EV/regenerative braking travel mode. Target driving force calculation component 50E can command, through motor control component 50C, inverter 46 to switch to receiving current generated by motor 12. In this way, negative motor torque can be generated by motor 12, and battery 44 can be recharged. In this example, battery 44 is recharged to a full battery SOC condition, but as previously discussed, battery 44 can be recharged to some other/lesser-than-full battery SOC condition. Moreover, because battery 44 is not fully recharged until the end of the downgrade, motor 12 has the ability to generate the above-mentioned negative motor torque to assist with decelerating hybrid vehicle 10. That is, if the downgrade is steep enough and/or hybrid vehicle 10 is traveling fast enough, e.g., at least approximately 45 mph, motor 12 can prevent unwanted acceleration during the downgrade.

It should be noted that although some embodiments are described in the context of a vehicle towing a load, various embodiments can be adapted to scenarios where a hybrid or electric-only vehicle is not towing a load.

Figure 4:
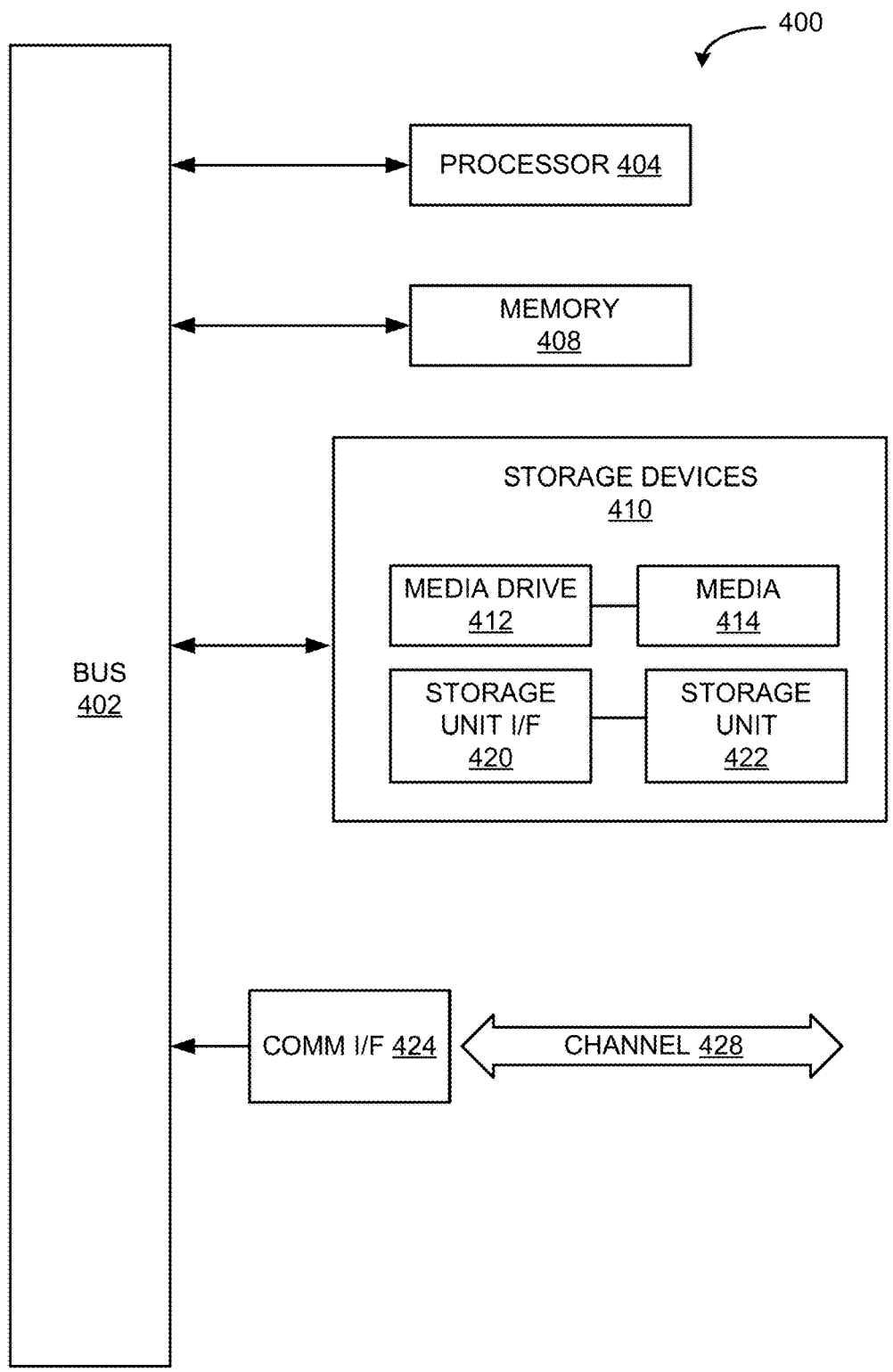
FIG. 4 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within computer processing units or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, electronic devices that might include some form of processing capability.

Computing component 400 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining a vehicle is approaching a downgrade;
   determining relevant mass of the vehicle and road load associated with the vehicle;
   calculating potential kinetic energy available from the downgrade based upon the relevant mass and road load associated with the vehicle, and one or more characteristics of the downgrade;
   determining a potential braking force available from an engine of the vehicle during travel over the downgrade;
   determining a target driving force to achieve a desired battery state of charge upon completing travel of the downgrade;
   determining an amount of positive motor torque of an electric motor of the vehicle, the amount of positive motor torque determined based on a difference between the target driving force and the potential braking force; and
   depleting a battery of the vehicle such that upon completing travel of the downgrade, the desired battery state of charge is achieved through operating the engine and the electric motor of the vehicle in a regenerative braking travel mode relative to the potential kinetic energy available from the downgrade.

2. The method of claim 1, wherein the vehicle comprises a hybrid electric vehicle comprising at least one internal combustion engine and at least one electric motor providing drive power to the vehicle.

3. The method of claim 1, wherein determining that the vehicle is approaching the downgrade comprises obtaining navigational information indicative of road conditions of a route along which the vehicle is traveling.

4. The method of claim 1, wherein the navigation information comprises at least the one or more characteristics of the downgrade.

5. The method of claim 1, wherein the vehicle is towing a load.

6. The method of claim 1, wherein determining the relevant mass of the vehicle comprises calculating the relevant mass based upon a drivetrain force of the vehicle and acceleration of the vehicle while traveling along a level section of roadway at a first speed.

7. The method of claim 6, wherein determining the road load associated with the vehicle comprises calculating the road load based upon the relevant mass of the vehicle, a drivetrain force and acceleration of the vehicle while traveling along a level section of the roadway at a second speed that is greater than the first speed.

8. The method of claim 1, wherein calculating the potential kinetic energy available from the downgrade comprises determining gravitational force that would be experienced by the vehicle while traveling along the downgrade based upon at least the relevant mass of the vehicle.

9. The method of claim 1, wherein the one or more characteristics of the downgrade comprise at least a grade angle of the downgrade, a duration the vehicle will travel along the downgrade, and a distance from a current location of the vehicle to a starting point of the downgrade.

10. The method of claim 1, wherein the potential kinetic energy is translated in an amount of electrical energy available from the downgrade for recharging the battery of the vehicle.

11. The method of claim 10, further comprising calculating the amount the battery is to be depleted by determining a difference between the desired battery state of charge and the electrical energy available from the downgrade.

12. The method of claim 11, further comprising determining whether the difference between the electrical energy available from the downgrade and the desired battery state of charge will result in the battery reaching the desired battery state of charge prior to completing travel of the downgrade.

13. The method of claim 12, further comprising correlating the amount of electrical energy available from the downgrade to an amount of positive motor torque to be generated by the motor of the vehicle prior to reaching a starting point of the downgrade.

14. The method of claim 12, wherein the positive motor torque generated by the motor of the vehicle provides a mechanism for the depletion of the battery.

15. The method of claim 1, wherein the desired battery state of charge comprises one of a fully charged condition and a non-fully charged condition, the amount of remaining charge being determined based upon one or more subsequent road conditions to be traveled by the vehicle.

16. The method of claim 1, further comprising enabling one or more electrically-driven accessories of the vehicle to deplete the battery of the vehicle when the vehicle is operating in an engine on travel mode.

17. A hybrid vehicle, comprising:
an internal combustion engine;
an electric motor operatively connected in parallel to the internal combustion engine; and
an electronic control unit adapted to:
  obtain navigational information regarding a downgrade that is upcoming on a route being traveled by the hybrid vehicle;
  operate the hybrid vehicle to deplete a battery providing electrical energy to the electric motor prior to traversing the downgrade;
  operate the hybrid vehicle in an electric motor on travel mode while traversing the downgrade to recharge the battery to a desired battery state of charge upon the hybrid vehicle completing its traversal of the downgrade, wherein an amount by which the battery is depleted is based upon a calculated potential kinetic energy available from the downgrade based upon one or more characteristics of the downgrade, a potential braking force available from the internal combustion engine, a target driving force determined for achieving the desired battery state of charge upon completing travel of the downgrade, and an amount of positive motor torque of the electric motor determined based on a different between the target driving force and the potential braking force.

18. The hybrid vehicle of claim 17, wherein the electronic control unit comprises a navigational unit adapted to obtain the navigational information from one or more of a positioning sensor and network provided navigational information.

19. The hybrid vehicle of claim 17, wherein the electronic control unit comprises a target driving force calculation component adapted to determine the amount by which to deplete the battery based upon potential kinetic energy attributable to effects of gravity when traversing the downgrade, and wherein the potential kinetic energy is recouped as electrical energy recouped by the battery of the vehicle.

20. The hybrid vehicle of claim 17, wherein the electronic control unit is adapted to operate the hybrid vehicle to deplete the battery by at least one of operating the electric motor, and enabling one or more battery-powered accessories of the hybrid vehicle prior to the hybrid vehicle traversing the downgrade to draw current from the battery.

* * * * *

UNITED STATES PATENT AND TRADEMARK OFFICE
CERTIFICATE OF CORRECTION

PATENT NO. : 10,392,003 B2
APPLICATION NO. : 15/669762
DATED : August 27, 2019
INVENTOR(S) : Thomas S. Hawley Page 1 of 1

It is certified that error appears in the above-identified patent and that said Letters Patent is hereby corrected as shown below:

In the Specification

Column 13, Line 60: "51" should be -- S1 --.

Signed and Sealed this
Eighth Day of October, 2019

Andrei Iancu
*Director of the United States Patent and Trademark Office*